United States Patent
Mallick et al.

(10) Patent No.: US 10,936,335 B2
(45) Date of Patent: *Mar. 2, 2021

(54) PATH-BASED MIGRATION OF CONTROL OF A MULTI-PATH LOGICAL DEVICE FROM A CURRENT MPIO DRIVER TO A TARGET MPIO DRIVER

(71) Applicant: EMC IP Holding Company LLC, Hopkinton, MA (US)

(72) Inventors: Sanjib Mallick, Bangalore (IN); Kurumurthy Gokam, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/261,856

(22) Filed: Jan. 30, 2019

(65) Prior Publication Data

US 2020/0241890 A1 Jul. 30, 2020

(51) Int. Cl.
*G06F 9/445* (2018.01)
*G06F 13/10* (2006.01)

(52) U.S. Cl.
CPC ........ *G06F 9/44505* (2013.01); *G06F 13/102* (2013.01)

(58) Field of Classification Search
None
See application file for complete search history.

(56) References Cited

U.S. PATENT DOCUMENTS

| 6,687,746 | B1 | 2/2004 | Shuster et al. |
| 6,697,875 | B1 | 2/2004 | Wilson |
| 7,454,437 | B1 | 11/2008 | Lavallee et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |
| 7,904,681 | B1 | 3/2011 | Bappe et al. |
| 7,925,872 | B2 | 4/2011 | Lai et al. |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Idriss N Alrobaye
*Assistant Examiner* — Dayton Lewis-Taylor
(74) *Attorney, Agent, or Firm* — Ryan, Mason & Lewis, LLP

(57) ABSTRACT

An apparatus in one embodiment comprises a host device that includes a set of input-output (IO) queues and a current multi-path input-output (MPIO) driver configured to select IO operations from the set of IO queues for delivery to the storage system. The current MPIO driver groups a plurality of paths from the host device to a logical volume of the storage system into a current multi-path logical device. The host device installs a target MPIO driver and migrates control of the multi-path logical device to the target MPIO driver from the current MPIO driver where the migration comprises generating a duplicate multi-path logical device for the target multi-path input-output driver, adding a new path to the current multi-path logical device that routes input-output operations to the duplicate multi-path logical device, and removing one or more paths of the current multi-path logical device other than the added new path.

20 Claims, 9 Drawing Sheets

(56) References Cited

U.S. PATENT DOCUMENTS

| | | |
|---|---|---|
| 9,400,611 B1 | 7/2016 | Raizen |
| 9,594,780 B1 | 3/2017 | Esposito et al. |
| 9,778,852 B1 | 10/2017 | Marshak et al. |
| 2004/0010563 A1 | 1/2004 | Forte et al. |
| 2007/0174849 A1 | 7/2007 | Cheung et al. |
| 2008/0043973 A1 | 2/2008 | Lai et al. |
| 2010/0313063 A1 | 12/2010 | Venkataraja et al. |
| 2011/0197027 A1 | 8/2011 | Balasubramanian et al. |
| 2014/0105068 A1 | 4/2014 | Xu |
| 2016/0117113 A1 | 4/2016 | Li et al. |

OTHER PUBLICATIONS

NVM Express, "NVM Express, Revision 1.3," NVM Express, May 1, 2017, 282 pages.
VMWare, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
U.S. Appl. No. 15/849,828 filed in the name of Sanjib Mallick et al. on Dec. 21, 2017 and entitled "Storage System with Input-Output Performance Control Utilizing Application Process Detection."
U.S. Appl. No. 15/795,653 filed in the name of Maneesh Pusalkar et al. on Oct. 27, 2017 and entitled "Storage System with Network-Wide Configurable Device Names."

```
300 ─┐  ┌──────────────────────────────────────────────────────────────────────┐
     │  │ mpathb (360000970000019780141353303234303B) dm-3 BRAND    ,ARRAY     │
     │  │ size=5.0G features='1 queue_if_no_path' hwhandler='0' wp=rw          │
     │  │ `-+- policy='service-time 0' prio=1 status=active                    │
212-1─┼──┤ |- 13:0:0:1    sdd    8:48      active ready running                │
212-2─┼──┤ |- 13:0:1:1    sdl    8:176     active ready running                │
212-3─┼──┤ |- 15:0:0:1    sdv    65:80     active ready running                │
     │  │                . . .                                                 │
212-P─┼──┤ |- 15:0:1:1    sdm    8:192     active ready running                │
     │  └──────────────────────────────────────────────────────────────────────┘
```

FIG. 3

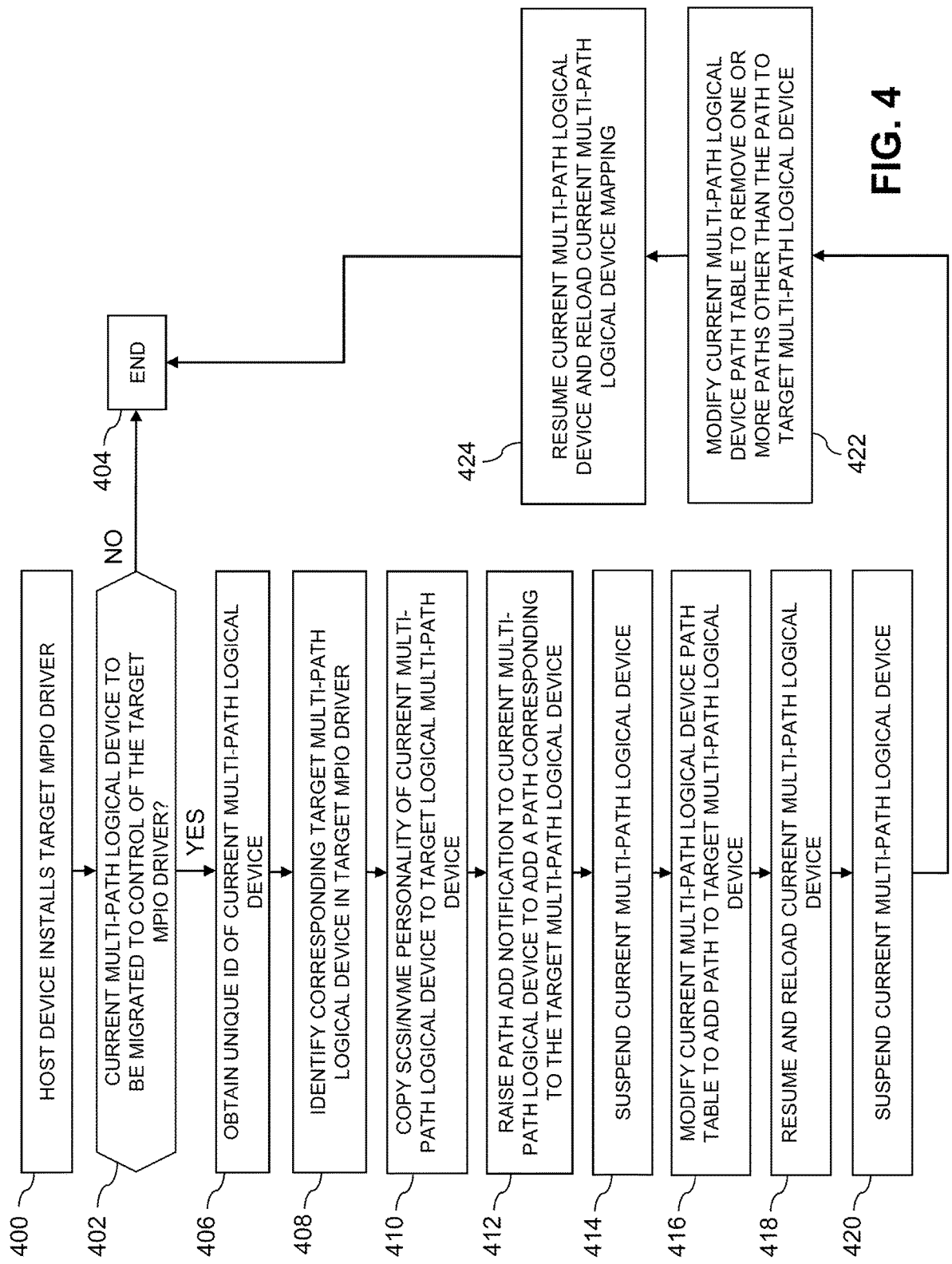

300 ~ mpathb (36000097000019780141353303234303S) dm-3 BRAND    ,ARRAY
size=5.0G features='1 queue_if_no_path' hwhandler='0' wp=rw
`-+- policy='service-time 0' prio=1 status=active
212-1    |- 13:0:0:1    sdd        8:48       active ready running
212-2    |- 13:0:1:1    sdl        8:176      active ready running
212-3    |- 15:0:0:1    sdv        65:80      active ready running
         . . .          . . .      . . .
212-P    |- 15:0:1:1    sdm        8:192      active ready running
212-P+1  `- #:#:#:#     target     120:112    active ready running << target multipath device

FIG. 6

300 — mpathb (36000097000019780141353303232343038) dm-3 BRAND   ,ARRAY
size=5.0G features='1 queue_if_no_path' hwhandler='0' wp=rw
`-+- policy='service-time 0' prio=1 status=active
212-P+1 —   `- #:#:#:#    target      120:112     active ready running << target multipath device

```
[root@lnq242083 ~]# powermt display dev=target
Pseudo name=target multi-path logical device
Array ID=000197801413
Logical device ID=0000240F
Device WWN=60000970000197801413533032343046
state=alive; policy=SymmOpt; queued-IOs=0
```

| ### | ——— Host ——— | | ——— Stor ——— | | —— I/O Path —— | | ——— Stats ——— | |
|---|---|---|---|---|---|---|---|---|
|  | HW Path | I/O Paths | Interf. |  | Mode | State | Q-IOs | Errors |
| 13 | lpfc | sdd | FA 1d:05 |  | active | alive | 0 | 0 |
| 13 | lpfc | sdl | FA 1d:04 |  | active | alive | 0 | 0 |
| 15 | lpfc | sdv | FA 1d:05 |  | active | alive | 0 | 0 |
| ... | ... | ... | ... |  | ... | ... | ... | ... |
| 15 | pfc | sdm | FA 1d:04 |  | active | alive | 0 | 0 |

PATH-BASED MIGRATION OF CONTROL OF A MULTI-PATH LOGICAL DEVICE FROM A CURRENT MPIO DRIVER TO A TARGET MPIO DRIVER

FIELD

The field relates generally to information processing systems, and more particularly to storage in information processing systems.

BACKGROUND

Storage arrays and other types of storage systems are often shared by multiple host devices over a network. A given host device may comprise a multi-path input-output (MPIO) driver that is configured to process input-output (IO) operations for delivery from the host device to the storage system. In some cases, a user of the host device may wish to update or replace the current MPIO driver on the host device. For example, if a new version of a current MPIO driver has been released, the user of the host device may wish to update the current MPIO driver to the new version. In another example, if the user of the host device wishes to use a new or different MPIO driver, the user of the host device may replace the current MPIO driver with the new or different MPIO driver. However, such an update or replacement of the current MPIO driver typically requires significant and substantial application downtime, such as, e.g., outages, reconfiguration, or other similar downtime, as the update is performed.

SUMMARY

Illustrative embodiments of the present invention provide techniques for migrating control of multi-path logical devices from a current MPIO driver to a target MPIO driver without requiring significant application downtime. The migration illustratively comprises adding a path to a current multi-path logical device of the current MPIO driver that routes IO operations from that current multi-path logical device to a target multi-path logical device of the target MPIO driver and removing one or more of the other paths of the current multi-path logical device, and in some embodiments removing all paths other than the added path. Removing the other paths allows the IO operations received by the current MPIO driver and selected for routing by the current multi-path logical device to be routed to the target multi-path logical device via the added path, for example, since no other paths are available in the current multi-path logical device. The target multi-path logical device then performs IO load balancing as normal. These and other embodiments overcome the problems of significant or substantial application downtime that can otherwise result when MPIO driver software is replaced. For example, since the target MPIO driver seamlessly takes over effective control of the current multi-path logical device, little or no application downtime is required to perform the migration of control from the current MPIO driver to the target MPIO driver and the host device may continue delivering IO operations to the storage system using the current multi-path logical device during and after the migration.

In one embodiment, an apparatus comprises a host device configured to communicate over a network with a storage system. The host device comprises a set of IO queues and a current MPIO driver configured to select IO operations from the set of IO queues for delivery to the storage system over the network. The current MPIO driver is further configured to group a plurality of paths from the host device to a logical volume of the storage system into a current multi-path logical device. The host device is further configured to install a target MPIO driver and to migrate control of the current multi-path logical device to the target MPIO driver from the current MPIO driver where the migration comprises generating a duplicate multi-path logical device for the target multi-path input-output driver. The duplicate multi-path logical device comprises the same grouping of the plurality of paths as the current multi-path logical device. The migration further comprises adding a new path to the current multi-path logical device. The new path is configured to route input-output operations from the current multi-path logical device to the duplicate multi-path logical device. The migration further comprises removing one or more paths of the current multi-path logical device other than the added new path. The host device is further configured to deliver input-output operations to the storage system via the duplicate multi-path logical device using the added new path of the current multi-path logical device.

These and other illustrative embodiments include, without limitation, apparatus, systems, methods and computer program products comprising processor-readable storage media.

BRIEF DESCRIPTION OF THE DRAWINGS

FIG. 3 is an example diagram illustrating the IO paths of the current multi-path logical device of FIG. 2 in an illustrative embodiment.

FIG. 4 is a flow diagram of an example process for migrating control of current multi-path logical devices from a current MPIO driver to a target MPIO driver without requiring application downtime in an illustrative embodiment.

FIG. 6 is an example diagram illustrating the IO paths of the current multi-path logical device of FIG. 5 including the added path in an illustrative embodiment.

FIG. 8 is an example diagram illustrating the IO paths of the current multi-path logical device of FIG. 7 including only the added path in an illustrative embodiment.

FIG. 9 is an example diagram illustrating the IO paths of the target multi-path logical device of FIG. 7 including the same IO paths as found in the diagram of FIG. 3 in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
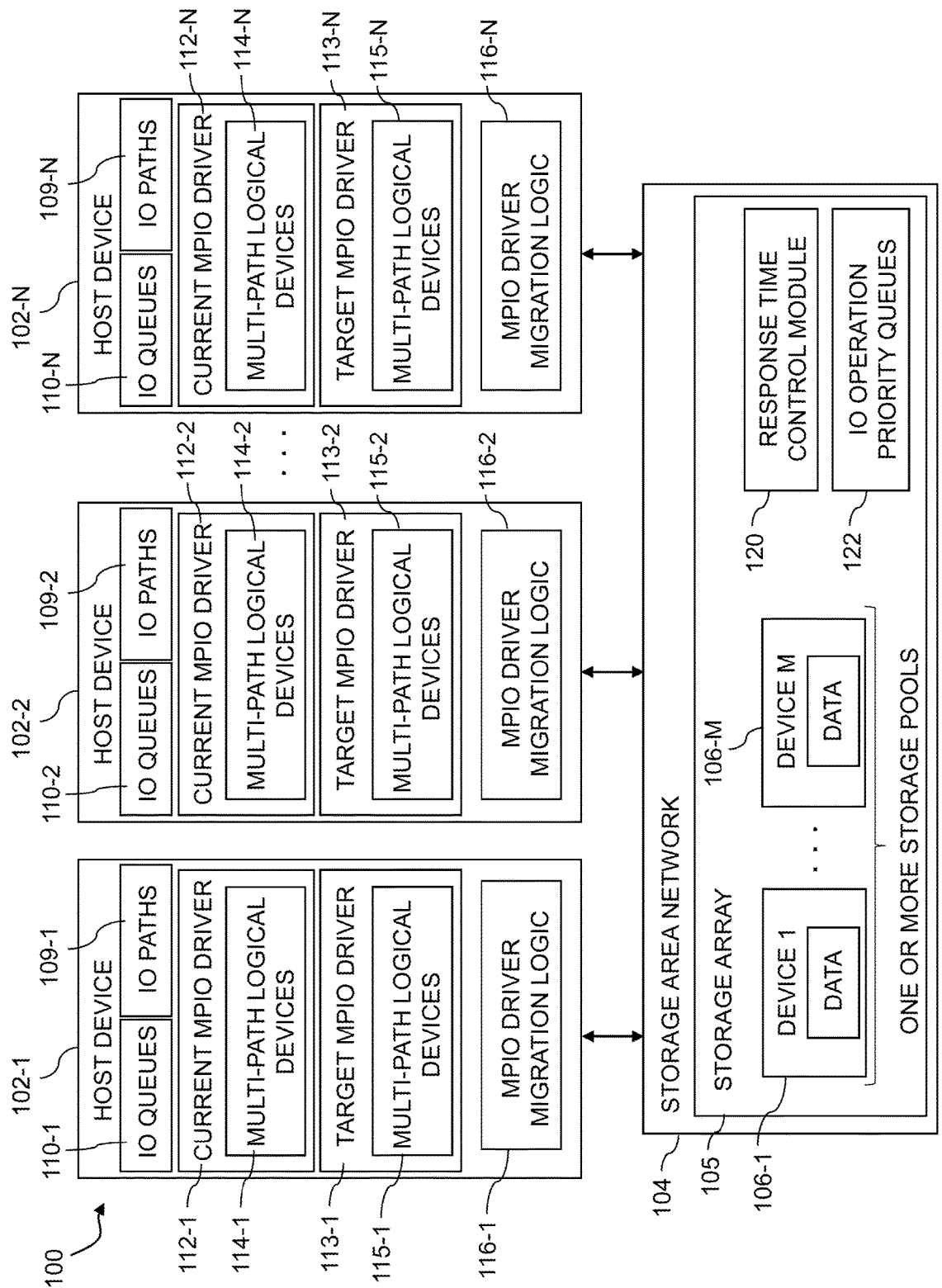
FIG. 1 is an example block diagram of an information processing system configured with functionality for migrating control of current multi-path logical devices from a current MPIO driver to a target MPIO driver without requiring application downtime in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The storage devices 106 of the storage array 105 of SAN 104 implement logical storage volumes such as, e.g., logical units (LUNs), that are configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise mall computer system interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths 109 to the storage array 105, with at least one of the storage devices 106 of the storage array 105 being visible to that host device 102 on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO paths 109-1, 109-2, . . . , 109-N, respective sets of IO queues 110-1, 110-2, . . . 110-N, respective current MPIO drivers 112-1, 112-2, . . . 112-N, and respective target MPIO drivers 113-1, 113-2, . . . 113-N, and respective MPIO driver migration logic 116-1, 116-2, . . . 116-N. In some embodiments, MPIO driver migration logic 116 may also or alternatively be referred to as MPIO driver target multipath deployment logic which is configured for managing the deployment of a target MPIO driver on a host device 102 and for migrating control of a current multi-path logical device to the target MPIO driver, as described herein with respect to the MPIO driver migration logic 116.

As used herein, IO paths 109-1 through 109-N, refer to information about or lists of the IO pathways between a given host device 102-1 through 102-N and one or more storage arrays 105. This information may include, for example, initiator-target pairs or other similar information that may define an IO pathway between the given host device 102 and the one or more storage arrays 105. This information may be used by an MPIO driver of the given host device to transmit data to or receive data from the one or more storage arrays 105 using the defined IO pathway.

While each host device 102 is illustrated as having a respective target MPIO driver 113 and MPIO driver migration logic 116, in some embodiments such target MPIO drivers 113 and MPIO driver migration logic 116 may be installed on one of host devices 102 or a subset of host devices 102. For example, target MPIO drivers 113 and MPIO driver migration logic 116 may be installed on host devices 102 for which a user wishes to migrate control of a multi-path logical device 114 associated with a current MPIO driver 112 to a target MPIO driver 113.

MPIO drivers typically group all IO paths 109 from a host to a LUN or other logical storage volume into a single logical device known as a multi-path logical device. For example, current MPIO drivers 112-1, 112-2, . . . 112-N, may have respective multi-path logical devices 114-1, 114-2, . . . , 114-N that each group at least a portion of the IO paths 109 together for the respective host device 102-1, 102-2, . . . 102-N and target MPIO drivers 113-1, 113-2, . . . 113-N, may have respective multi-path logical devices 115-1, 115-2, . . . 115-N that each group at least a portion of the IO paths 109 together for the respective host device 102-1, 102-2, . . . , 102-N. In some embodiments, each respective MPIO driver 112 or 113 may include multiple multi-path logical devices 114 or 115, respectively. The individual block devices representing each IO path 109 are known as native devices. Applications use a multi-path logical device for IO operations so that the IO operations may be distributed across all available IO paths 109. When IO paths fail, the MPIO driver will typically redirect the IO operations to other alive IO paths in the multi-path logical device.

The MPIO drivers described herein may comprise, for example, otherwise conventional MPIO drivers, such as PowerPath drivers from Dell EMC, suitably modified in the manner disclosed herein to implement functionality for migrating control of multi-path logical devices from a current MPIO driver to a target MPIO driver without requiring significant application downtime. Other types of MPIO drivers from other driver vendors may be suitably modified to incorporate functionality for migrating control of multi-path logical devices as disclosed herein.

The multi-path layer comprising MPIO drivers supports multiple IO paths 109 between each of the host devices 102 and the storage array 105. These IO paths 109 are illustratively associated with respective initiator-target pairs, with each initiator comprising a host bus adaptor (HBA) or other initiating entity of a given host device, such as the host device 102-1, and each target comprising a port or other targeted entity corresponding to one or more of the storage devices 106 of the storage array 105. As noted above, the storage devices 106 illustratively comprise LUNs or other types of logical storage volumes.

IO paths 109 may be added or deleted between the host devices 102 and the storage array 105 in the system 100. For example, the addition of one or more new IO paths 109-1 from host device 102-1 to the storage array 105 or the deletion of one or more existing IO paths 109-1 from the host device 102-1 to the storage array 105 may result from respective addition or deletion of at least a portion of the storage devices 106 of the storage array 105.

Addition or deletion of IO paths can also occur as a result of zoning and masking changes or other types of storage system reconfigurations performed by a storage administrator or other user.

In some embodiments, IO paths are added or deleted in conjunction with the addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, IO path discovery scans may be performed by the MPIO drivers of the multi-path layer as needed in order to discover the addition of new IO paths or the deletion of existing IO paths.

A given IO path discovery scan can be performed utilizing known functionality of conventional MPIO drivers, such as PowerPath drivers.

The IO path discovery scan in some embodiments may be further configured to identify one or more new LUNs or other logical storage volumes associated with the one or more new IO paths identified in the path discovery scan. The IO path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new IO paths 109 identified in an IO path discovery scan of the type described above, the corresponding one of the host devices 102 is configured to execute a host registration operation for that IO path 109. The host registration operation for a given new IO path 109 illustratively provides notification to the storage array 105 that the corresponding one of the host devices 102 has discovered the new path.

The MPIO drivers utilize the multiple IO paths 109 described above to send IO operations from the host devices 102 to the storage array 105.

For example, an MPIO driver is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The current MPIO drivers 112 and target MPIO drivers 113 collectively comprise a multi-path layer of the host devices 102. The MPIO driver migration logic 116 provides functionality for migrating control of multi-path logical devices 114 from a current MPIO driver 112 to a target MPIO driver 113 without requiring significant application downtime. In some embodiments, for example, host devices 102 may provide the functionality for migrating control of multi-path logical devices from a current MPIO driver 112 to a target MPIO driver 113 using MPIO driver migration logic 116. In some embodiments, MPIO driver migration logic 116 may alternatively be included as part of a target MPIO driver 113.

Since applications continuously use the multi-path logical devices for IO operations, it may become challenging to remove/replace a current MPIO driver 112 without disrupting IO operations or without causing substantial or significant application downtime in the applications using the host device 102 where the removal is being performed. Since the multi-path logical device 114 is an entity created by the current MPIO driver 112, the current MPIO driver 112 cannot be replaced without first uninstalling and removing the corresponding multi-path logical devices 114.

A user may wish to modify or replace a current MPIO driver 112 for many reasons including, for example, better IO throughput, additional features, or other similar reasons. Since the multi-path logical devices 114 created by the current MPIO driver 112 are tightly coupled to the current MPIO driver 112 in existing systems, users are not able to modify or replace the current MPIO driver 112 without incurring significant and substantial application downtime.

MPIO driver migration logic 116 is configured to migrate control of multi-path logical devices 114 in host device 102 from using a current MPIO driver 112 to select and deliver IO operations to a storage array 105 to using a target MPIO driver 113 to select and deliver the IO operations using its own corresponding multi-path logical device 115. This migration is performed without incurring significant or substantial downtime, and in some embodiments without incurring any downtime, of an application running on the host device 102 that is performing the migration. For example, MPIO driver migration logic 116 is configured to perform the migration by transferring effective control of multi-path logical devices 114 from a current MPIO driver 112 to a target MPIO driver 113 through the use of pathing.

Unlike the above described systems, where switching to a target MPIO driver 113 requires uninstalling the multi-path logical devices 114 created by a current MPIO driver 112, MPIO driver migration logic 116 instead continues using the multi-path logical devices 114 that have already been generated or created by the current MPIO driver 112. Under the MPIO driver migration logic 116, control of a multi-path logical device 114 that was created by the current MPIO driver 112 is transferred to the target MPIO driver 113 by adding the target MPIO driver 113 as a new path in the multi-path logical device 114 and removing one or more of the other paths, and in some embodiments all of the other paths. This allows any IO operations that utilize the multi-path logical device 114 to traverse the new path to the target MPIO driver 113 before being acted on by the multi-path logical device 115 of the target MPIO driver 113 for load balancing and routing to the SAN 104. This seamless migration allows the target MPIO driver 113 to preserve the IO operation flow of the applications running on the host device 102 for which the migration is being performed.

Figure 2:
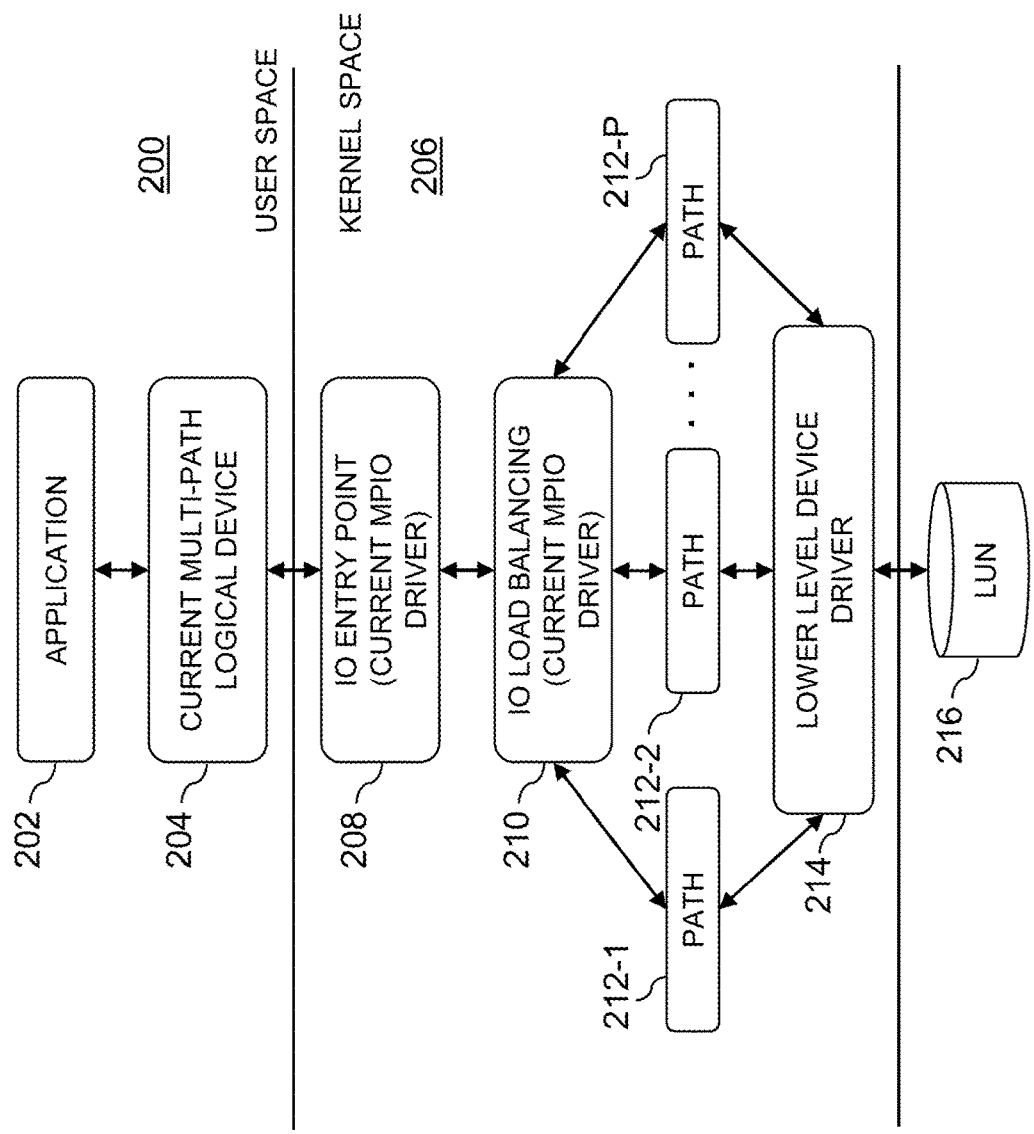
FIG. 2 is an example diagram illustrating the interaction path between a host device and a storage array using a current multi-path logical device controlled by a current MPIO driver in an illustrative embodiment.

With reference now to FIGS. 1 and 2, an example interaction path between the host device 102 and storage array 105 using a current multi-path logical device 114 controlled by current MPIO driver 112 is illustrated.

For example, in a user space 200, an application 202 resident on a host device 102 submits IO operations for processing. Current MPIO driver 112 may select the IO operations for delivery via a multi-path logical device 114, e.g., current multi-path logical device 204 in FIG. 2, establishing communication between application 202 and the current multi-path logical device 204.

In a kernel space 206, an IO entry point 208 of the current multi-path logical device 204 that is controlled by the current MPIO driver 112 is configured to receive the selected IO operations and submit the selected IO operations to an IO load balancing component 210 of the current MPIO driver 112. The IO load balancing component 210 performs load balancing, for example, by assigning the IO operations to different paths 212-1, 212-2, . . . 212-P of the multi-path logical device 204. The IO paths 212-1, 212-2 . . . 212-P may be generated for the multi-path logical device 204 by the MPIO driver 112 as described above, for example, using IO path discovery scans. FIG. 3 illustrates an example table 300 of the active paths 212-1, 212-2, 212-3, . . . 212-P of the current multi-path logical device 204. As can be seen from example table 300 of FIG. 3, the paths 212 are active, ready, and running.

In some embodiments, the IO operations may be balanced across the paths 212, where, for example, path 212-1 receives one or more IO operations, path 212-2 receives one or more IO operations, path 212-3 receives one or more IO operations, . . . and path 212-P receives one or more IO operations. In some embodiments, a given path may receive none of the IO operations, all of the IO operations, or any portion of the IO operations. The number of IO operations assigned to each path may be determined, for example, based on the current load on each path, or in any other manner commonly used by MPIO drivers during load balancing.

A lower level device driver 214 is configured to receive the IO operations from the paths 212, and to transfer the IO operations to a target LUN 216 of storage array 105.

Illustrative embodiments of the techniques and functionality of MPIO driver migration logic 116 will now be described in more detail with reference to FIG. 4. The process of FIG. 4 is described with reference also to FIGS. 1-3 and 5-9.

The process as shown in FIG. 4 includes steps 400 through 424, and is suitable for use in the system 100 but is more generally applicable to other types of systems comprising multiple host devices and a shared storage system. The shared storage system in this embodiment is assumed to comprise at least one storage array having a plurality of storage devices. The storage devices can include logical storage devices, such as LUNs or other logical storage volumes.

At 400, the host device 102 installs the target MPIO driver 113. In some embodiments, target MPIO driver 113 may already be installed on host device 102. For example, target MPIO driver 113 may already be active on the host device 102 and may select IO operations from the IO queues 110 for delivery to the SAN 104, e.g., using its own multi-path logical devices 115. In some embodiments, MPIO driver migration logic 116 may determine whether both the current MPIO driver 112 and target MPIO driver 113 are present on a host device 102. For example, if the target MPIO driver 113 has not been installed on the host device 102 or the current MPIO driver 112 is not present, MPIO driver migration logic 116 may abort since no migration of control of the multi-path logical devices 114 may occur.

At 402, MPIO driver migration logic 116 determines whether or not a multi-path logical device 114 of the current MPIO driver 112 is to be migrated to control of the target MPIO driver 113. For example, the MPIO driver migration logic 116 may obtain or otherwise receive an indication from a host device 102 or another source that indicates that the multi-path logical device 114 is to be migrated to the target MPIO driver 113. In illustrative embodiments, a multi-path logical device 114 of the current MPIO driver 112 that is to be migrated to control of the target MPIO driver 113 may be referred to as a current multi-path logical device 114.

In some embodiments, an IO control message (IOCTL) may be sent to the MPIO driver migration logic 116 from the host device 102 that indicates to the MPIO driver migration logic 116 that migration of control of a current multi-path logical device 114 from the current MPIO driver 112 to the target MPIO driver 113 needs to be performed.

If MPIO driver migration logic 116 determines that there are no current multi-path logical devices 114 to be migrated to control of the target MPIO driver 113, the process proceeds to 404 and ends. If MPIO driver migration logic 116 determines that a current multi-path logical device is to be migrated, for example, current multi-path logical device 204, the process proceeds to 406. The remainder of the process of FIG. 4 will be described with reference to current multi-path logical device 204 as the multi-path logical device 114 to be migrated to control of the target MPIO driver 113.

At 406, MPIO driver migration logic 116 obtains a unique identifier of the current multi-path logical device 204. For example, in some embodiments, MPIO driver migration logic 116 may obtain or create a data structure, such as, e.g., an array, list, or other data structure, that contains information about each current multi-path logical device 114 for which control is to be migrated to the target MPIO driver 113, including an entry for the current multi-path logical device 204. The data structure may contain information about the native paths that are included in each of the current multi-path logical devices 114. For example, a user may specify which current multi-path logical devices 114 will be included in the data structure for migration, e.g., current multi-path logical device 204.

In some embodiments, a user may specify that the control of all multi-path logical devices 114 under control of a current MPIO driver 112 will be migrated and each multi-path logical device 114 under control of the current MPIO driver 112 may be added to or included in the data structure as a current multi-path logical device 114.

In some embodiments, the IOCTL may provide or contain information about the current multi-path logical device 114 to be migrated, such as, e.g., some or all of the information stored in the entry in the data structure for the current multi-path logical device 114. In some embodiments, the IOCTL may simply indicate which current multi-path logical device 114 needs to be migrated and MPIO driver migration logic 116 may retrieve the information from the data structure.

Each multi-path logical device entry in the data structure may comprise information that identifies the current multi-path logical device 114. For example, an entry in the data structure may comprise a device major number, a device minor number, a device unique identifier, a combination thereof, or any other information that identifies a current multi-path logical device 114. In some embodiments, the information contained in the entry of the data structure may uniquely identify the current multi-path logical device 114. As an example, the device unique identifier may comprise a Network Addressing Authority identifier (NAA ID), such as, e.g., an NAA 6 ID. As another example, the device unique identifier may comprise a World Wide Identifier (WWID). In some embodiments, the device unique identifier may comprise both an NAA ID and a WWID. In some embodiments, the data structure may be stored in a database or a persistent file. An entry in the data structure for a current multi-path logical device 114 may comprise, for example, a structure similar to following pseudocode:

```
Struct_dev_transitioned {
    Char * device_name;
    Char unique-ID[100];
    ..
};
```

In illustrative embodiments, some or all of the information contained in the example table 300 of FIG. 3 may be included in an entry of the data structure for a particular current multi-path logical device 114, e.g., for current multi-path logical device 204.

At 408, MPIO driver migration logic 116 identifies a multi-path logical device 115 of the target MPIO driver 113 that corresponds to the current multi-path logical device 204 that is to be migrated to control of the target MPIO driver 113, referred to herein in some embodiments as the target multi-path logical device. For example, MPIO driver migration logic 116 may use the obtained unique identifier, e.g., NAA ID, WWID, a combination thereof, or any other unique identifier, to identify the corresponding target multi-path logical device. For example, the NAA ID or WWID may contain information about the LUN 216 and associated with the current multi-path logical device 204 which may be used to identify a corresponding target multi-path logical device under control of the target MPIO driver 113 associated with the same LUN 216, e.g., target multi-path logical device 504 as illustrated in FIG. 5.

At 410, MPIO driver migration logic 116 duplicates or copies the SCSI or non-volatile memory (NVM) express (NVMe) personality of the current multi-path logical device 204 to the target multi-path logical device 504, e.g., information about the paths 212-1 through 212-P, lower level device driver 214, partitions, and any other information that is relevant for routing incoming IO operations to the LUN 216. For example, in some embodiments, target multi-path logical device 504 may be considered a duplicate of current multi-path logical device 204 that runs as part of the target MPIO driver 113 and uses the same paths 212 and lower level device driver 214 as current multi-path logical device 204 to communicate with LUN 216.

Figure 5:
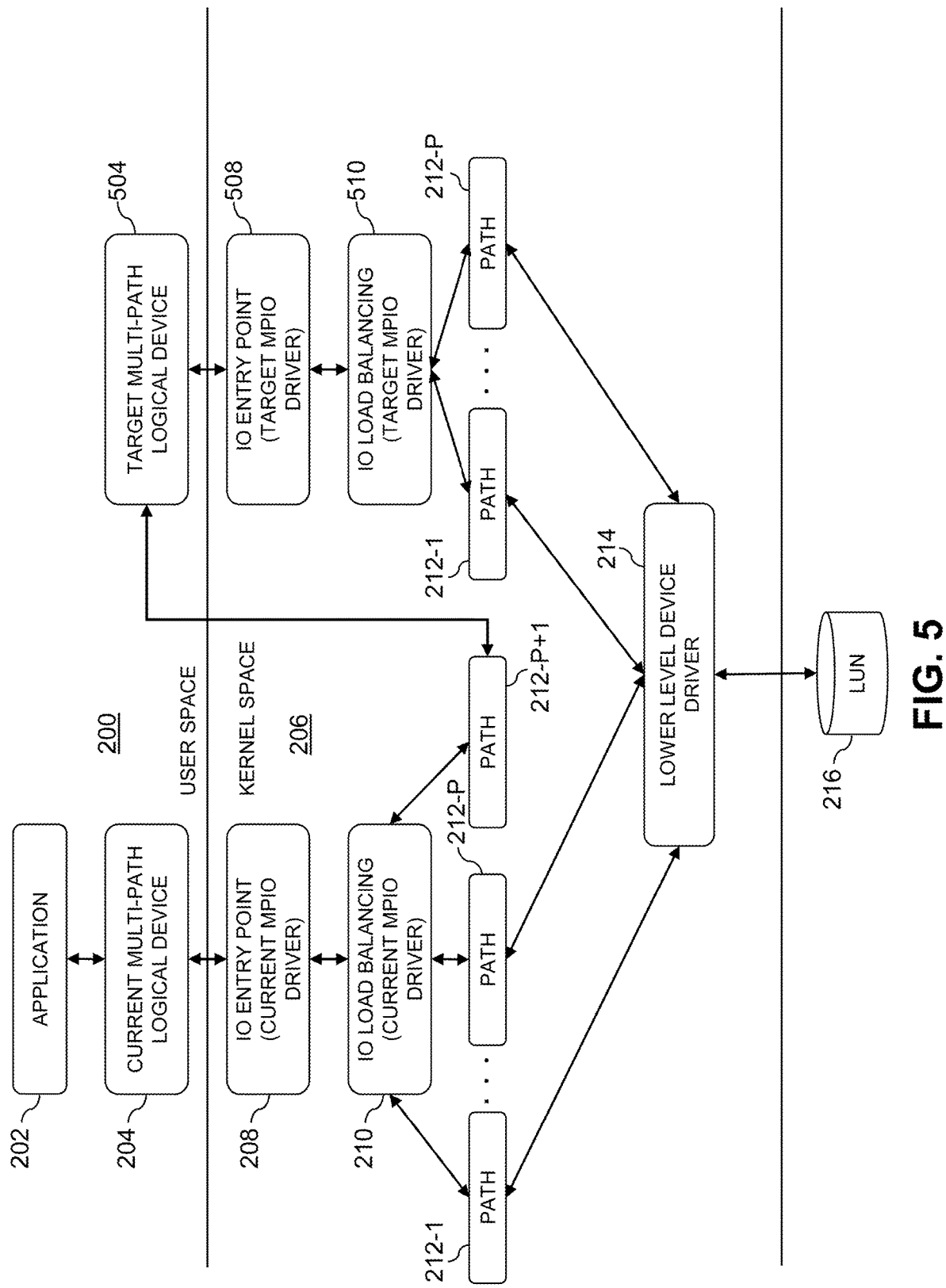
FIG. 5 is an example diagram illustrating the current multi-path logical device of FIG. 2 including the addition of a path to a target multi-path logical device controlled by a target MPIO driver in an illustrative embodiment.

For example, as shown in FIG. 5, target multi-path logical device 504 may reside in user space 200 and have an IO entry point 508 in the kernel space 206 that is controlled by the target MPIO driver 113 and is configured to receive IO operations and submit them to an IO load balancing component of the target MPIO driver 112. The IO load balancing component 510 performs load balancing, for example, by assigning the IO operations to the different paths 212-1 through 212-P. In some embodiments, for example, the IO load balancing component 510 of the target MPIO driver 113 may function in a different manner than the IO load balancing component 210 of the current MPIO driver 112, where, for example, if the same IO operations were submitted to both the current and target multi-path logical devices 204/504, different ones of the IO paths 212 may be traversed to reach the lower level device driver 214 and LUN 216. In some embodiments, the current and target MPIO drivers 112/113 may alternatively utilize the same or similar logic for IO load balancing components 210/510 such that the same paths 212 would be traversed.

At 412, MPIO driver migration logic 116 raises a path add notification to the current multi-path logical device 204 to add a new path 212-P+1 corresponding to the target multi-path logical device 504. In some embodiments, the path add notification comprises a function call or other notifier that causes the current multi-path logical device to add a path. For example, any IO operations that are directed to the new path 212-P+1 are directed by the new path 212-P+1 to the target multi-path logical device 504, as shown in FIG. 5. For example, the path add notification may comprise an indication or instruction to the current multi-path logical device 204 to add the new path 212-P+1 where the new path 212-P+1 is a path to the target multi-path logical device 504.

At 414, as part of the path add notification, MPIO driver migration logic 116 temporarily suspends the current multi-path logical device 204 and, at 416, modifies a path table of the current multi-path logical device 204 to add the new path 212-P+1 to the target multi-path logical device 504. In some embodiments, for example, the current MPIO driver 112 comprises logic for suspending the current multi-path logical device 204 and modifying the path table of the current multi-path logical device 204. In some embodiments, the target MPIO driver 113 comprises the logic for suspending the current-multipath logical device 204 and modifying the path table of the current multi-path logical device 204. In some embodiments, the host device 102 comprises the logic for suspending the current multi-path logical device 204 and modifying the path table of the current multi-path logical device 204 separate from current MPIO driver 112 and target MPIO driver 113.

At 418, MPIO driver migration logic 116 resumes and reloads the current multi-path logical device to finalize the addition of the new path 212-P+1. For example, as shown in FIG. 5, the new path 212-P+1 is included as a path with the set of paths 212-1 through 212-P for the current multi-path logical device 204 and directs any IO operations that it receives to the target multi-path logical device 504. As shown in FIG. 6, the example path table 300 has been updated to include the new path 212-P+1.

In illustrative embodiments, the temporary suspension of the current multi-path logical device 204, addition of the new path 212-P+1 to a path table of the current multi-path logical device 204, and resumption and reloading of the current multi-path logical device 204 takes only a fraction of a second and has little to no impact on the function and latency of the system.

At 420, MPIO driver migration logic 116 again temporarily suspends the current multi-path logical device 204.

At 422, MPIO driver migration logic 116 modifies the path table of the current multi-path logical device 204 to remove one or more paths 212, and in some embodiments, all paths 212, other than the newly added path 212-P+1. For example, paths 212-1 through 212-P may be removed from the path table, leaving only path 212-P+1 in the path table.

Figure 7:
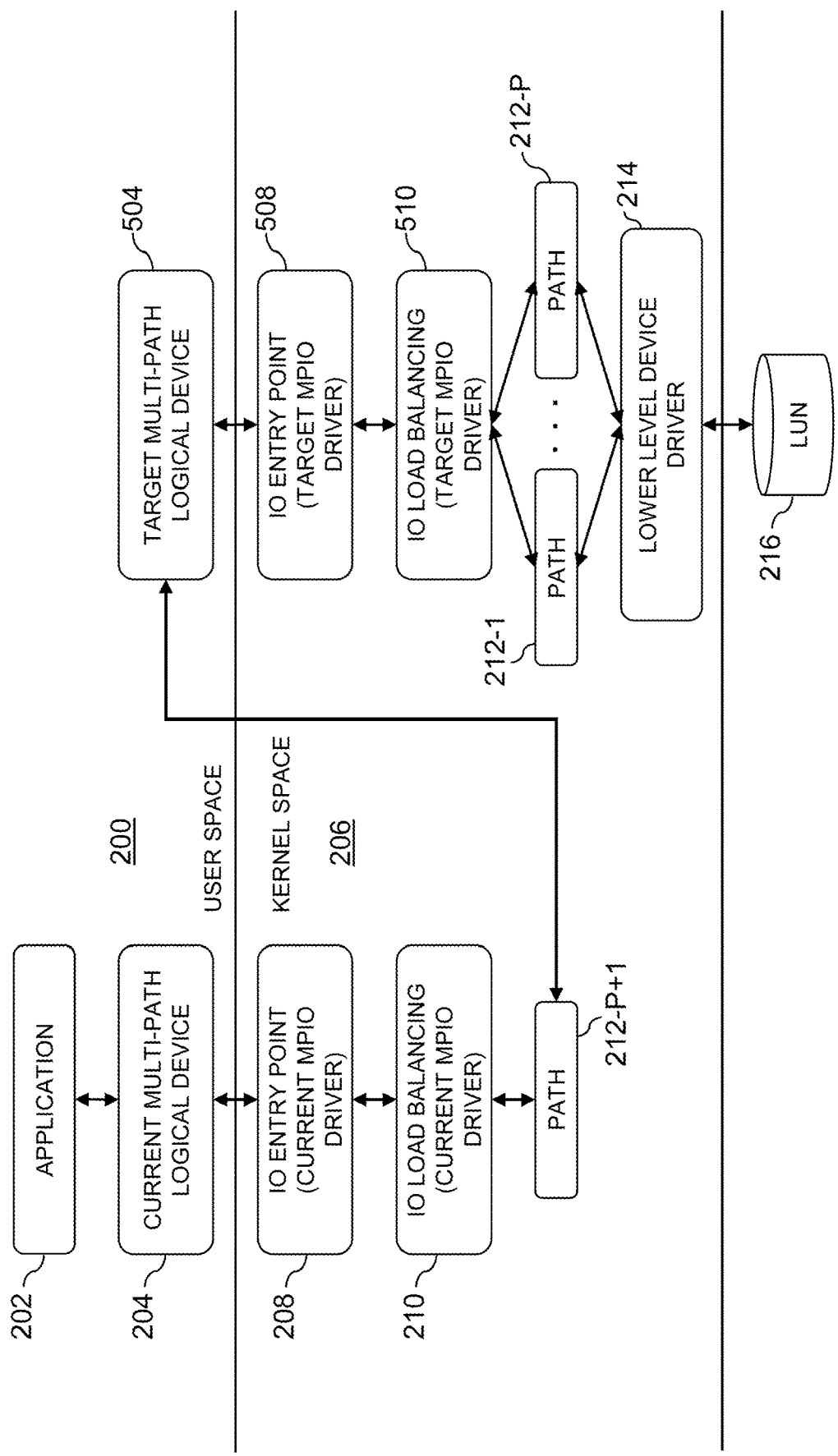
FIG. 7 is an example diagram illustrating the current multi-path logical device of FIG. 5 with paths other than the added path to a target multi-path logical device removed in an illustrative embodiment.

At 424, MPIO driver migration logic 116 resumes and reloads the current multi-path logical device to finalize the removal of the other paths 212. For example, as shown in FIG. 7, path 212-P+1 is the now the only path for the current multi-path logical device 204 and directs any IO operations that the current multi-path logical device 204 receives to the target multi-path logical device 504. As shown in FIG. 8, the example path table 300 has been updated to remove paths 212-1 through 212-P leaving only path 212-P+1.

Target multi-path logical device 504 is then used to send IO operations received from current multi-path logical device 204 via path 212-P+1 to the LUN 216 via paths 212-1 through 212-P according to the IO load balancing component 510 of the target MPIO driver 113, e.g., using path table 900 of target multi-path logical device 504, shown in FIG. 9, which includes paths 212-1 through 212-P.

In illustrative embodiments, the temporary suspension of the current multi-path logical device 204, removal of the paths 212-1 through 212-P from the path table of the current multi-path logical device 204, and resumption and reloading of the current multi-path logical device 204 takes only a fraction of a second and has little to no impact on the function and latency of the system.

The process then returns to step 404 and ends.

In this manner, control of the current multi-path logical device 204 is effectively transferred to the target MPIO driver 113 since IO operations that are selected to use the current multi-path logical device 204 will be automatically routed via path 212-P+1 to the target multi-path logical device 504 which uses the IO load balancing component 510 of the target MPIO driver 113. In addition, the host device 102 does not require reconfiguration or downtime to utilize the target multi-path logical device 504 via the path 212-P+1 since only the current multi-path logical device 204 needs to be temporarily suspended, and even then, for only a fraction of a second at a time to update the path table to add or remove paths which may already occur due to IO path discovery scans identifying new paths to be added to the path table or paths to be removed from the path table.

Separate instances of the FIG. 4 process may be performed in respective additional host devices that share the storage array.

The particular processing operations and other system functionality described in conjunction with the flow diagram of FIG. 4 are presented by way of illustrative example only, and should not be construed as limiting the scope of the disclosure in any way. Alternative embodiments can use other types of processing operations involving host devices, storage systems and MPIO driver migration logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different MPIO driver migration logic arrangements within a given information processing system.

Functionality such as that described in conjunction with the flow diagram of FIG. 4 can be implemented at least in part in the form of one or more software programs stored in memory and executed by a processor of a processing device, such as a computer or server. As will be described herein, a memory or other storage device having executable program code of one or more software programs embodied therein is an example of what is more generally referred to herein as a "processor-readable storage medium."

Numerous alternative arrangements of these and other features can be used in implementing the FIG. 4 process and other illustrative embodiments.

The illustrative embodiments disclosed herein can provide a number of significant advantages relative to conventional arrangements. For example, some embodiments configure a multi-path layer of one or more host devices to include functionality for migrating control of multi-path logical devices from a current MPIO driver to a target MPIO driver without requiring significant application downtime in an associated storage array or other type of storage system. The multi-path layer in such arrangements can be configured to migrate control of multi-path logic devices from current MPIO drivers to target MPIO drivers.

In some embodiments, in conjunction with a reboot of the host device, MPIO drivers, a storage array or other portion of the system, additional processes may be performed due to the migration of one or more current multi-path logical devices 114 to control of the target MPIO driver 113 as will now be described in more detail with reference to FIG. 10.

Figure 10:
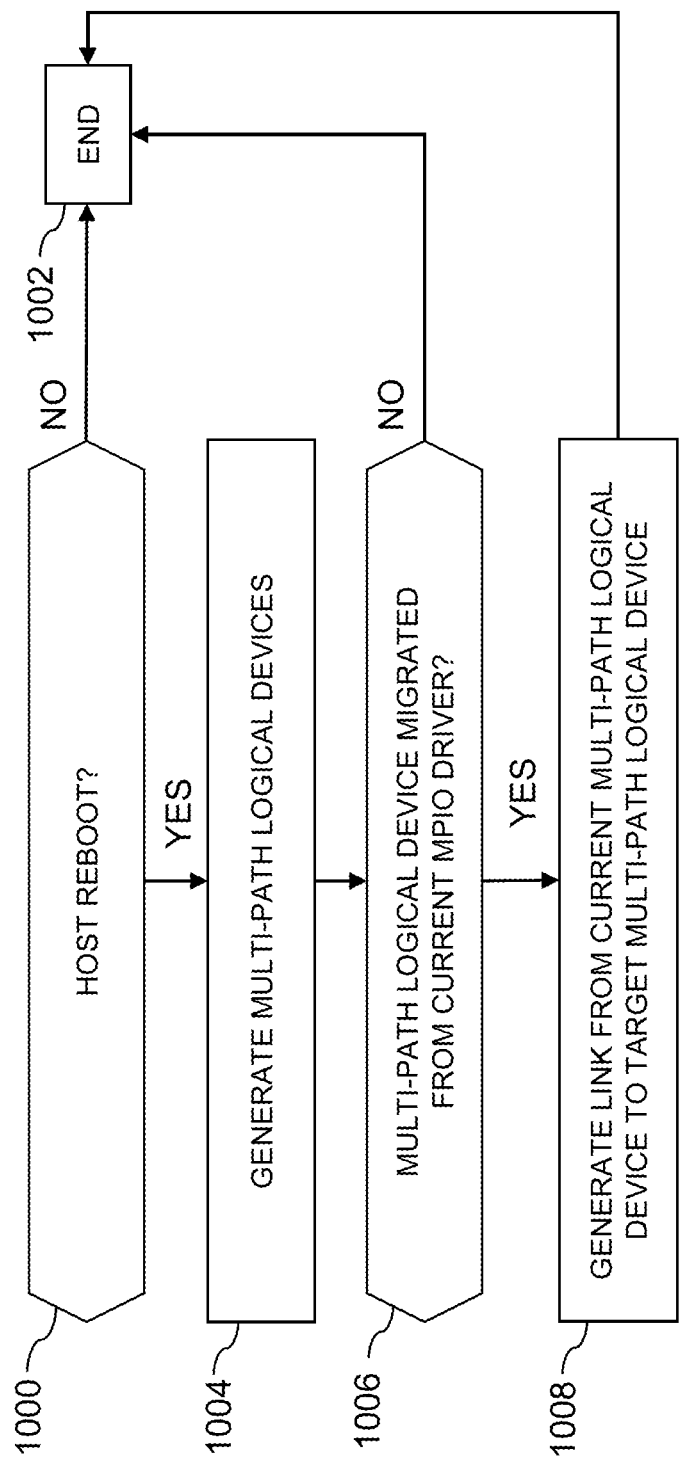
FIG. 10 is a flow diagram of an example process performed by a target MPIO driver in conjunction with a reboot after control of a current multi-path logical device has been migrated to the target MPIO driver in an illustrative embodiment.

The process as shown in FIG. 10 includes steps 1000 through 1008, and is suitable for use in the system 100 but is more generally applicable to other types of systems comprising multiple host devices and a shared storage system. The shared storage system in this embodiment is assumed to comprise at least one storage array having a plurality of storage devices. The storage devices can include logical storage devices, such as LUNs or other logical storage volumes.

At 1000, the target MPIO driver 113 determines whether or not the host device 102 or another component of the system has rebooted. If no reboot has occurred the process ends at 1002. In some embodiments, the host device 102 may indicate to the target MPIO driver 113 that a host reboot has occurred. In some embodiments, target MPIO driver 113 may determine that a host reboot has occurred upon initialization of the target MPIO driver 113 on the host device 102 in conjunction with the reboot process.

At 1004, the target MPIO driver 113 generates its multi-path logical devices 115, e.g., using IO path discovery scans as described above.

At 1006, while generating a given multi-path logical device 115, the target MPIO driver 113 checks if the given multi-path logical device 115 is associated with a multi-path logical device 114 that was previously migrated to control of the target MPIO driver 113 from the current MPIO driver 112, for example, as described above by adding the given multi-path logical device 115 as the sole path for the multi-path logical device 114.

As an example, the target MPIO driver 113 may compare the unique ID of the multi-path logical device 115 being generated in conjunction with the system boot with the unique ID associated with multi-path logical device entries in a data structure that maintains a list of which multi-path logical devices have been migrated from control of the current MPIO driver 112 to the target MPIO driver 113, e.g., a transitioned device list. If the unique ID of the multi-path logical device 115 being generated matches the unique ID associated with one of the multi-path logical device entries in the data structure, the target MPIO driver 113 may determine that the given multi-path logical device 115 is associated with a multi-path logical device 114 that was migrated to control of the target MPIO driver 113.

If the target MPIO driver 113 determines that the given multi-path logical device 115 is not associated with a multi-path logical device 114 that was migrated, the target MPIO driver 113 continues generating the given multi-path logical device as normal and the process ends at 1002.

If the target MPIO driver 113 determines that the given multi-path logical device 115 is associated with a multi-path logical device 114 that was migrated, the target MPIO driver 113 continues generating the given multi-path logical device 115 as normal and also creates a link from the associated multi-path logical device 114 to the given multi-path logical device 115, e.g., at a directory, address, or other mechanism that was used by the current MPIO driver 112 to communicate with the multi-path logical device 114 at 1008. The link operates such that any call to the associated multi-path logical device 114 is instead automatically routed to the given multi-path logical device 115. For example, where each of the multi-path logical device 114 and given multi-path logical device 115 are files in a directory, an attempt to open the file of the multi-path logical device 114 will automatically open the file of the given multi-path logical device 115 due to the link. In this manner, the host device 102 does not require a reconfiguration to use the new multi-path logical devices 115 created by target MPIO driver 113 in conjunction with a system boot. The process then continues to 1002 and ends. In some embodiments, the association between the multi-path logical device 114 and the given multi-path logical device 115 is removed from the transitioned device list.

Separate instances of the FIG. 10 process may be performed in respective additional host devices that share the storage array.

The particular processing operations and other system functionality described in conjunction with the flow diagram of FIG. 10 are presented by way of illustrative example only, and should not be construed as limiting the scope of the disclosure in any way. Alternative embodiments can use other types of processing operations involving host devices, storage systems and MPIO driver migration logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different MPIO driver migration logic arrangements within a given information processing system.

Functionality such as that described in conjunction with the flow diagram of FIG. 10 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for migrating control of multi-path logical devices from a current MPIO driver to a target MPIO driver without requiring significant application downtime are carried out at least in part under the control of its MPIO driver migration logic 116. For example, MPIO driver migration logic 116 is illustratively configured to control performance of portions of the process shown in the flow diagrams described above in conjunction with FIGS. 4 and 10, and the diagrams of FIGS. 2, 3 and 5-9.

It is assumed that each of the other MPIO drivers 112 and 113 are configured in a manner similar to that described above and elsewhere herein for the first current MPIO driver 112-1 and first target MPIO driver 113-1. The other host devices 102 of the system 100 are therefore also configured to communicate over the SAN 104 with the storage array 105 and the MPIO drivers 112 and 113 of such other host devices are each similarly configured to select JO operations from its corresponding one of the sets of JO queues 110 for delivery to the storage array 105 over the SAN 104, and to perform the disclosed functionality for migrating control of multi-path logical devices 114 from a current MPIO driver 112 to a target MPIO 113 driver without requiring significant application downtime. Accordingly, functionality described above in the context of the first MPIO drivers 112-1 and 113-1 is assumed to be similarly performed by each of the other MPIO drivers 112-2 and 113-2 through 112-N and 113-N for migrating control of respective multi-path logical devices 114-1 through 114-N.

The MPIO drivers 112 and 113 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support migration of the control of multi-path logical devices 114 from a current MPIO driver 112 to a target MPIO 113 driver without requiring significant application downtime.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of functionality for migrating control of multi-path logical devices as disclosed herein, many storage systems will require substantial or significant application downtime to update, upgrade, or otherwise change their MPIO drivers. This leads to inefficiencies in the storage system as well as in the host devices that share that storage system.

Such drawbacks are advantageously overcome in illustrative embodiments herein by utilization of MPIO driver migration logic 116 to implement functionality for migrating control of multi-path logical devices 114 from a current MPIO driver 112 to a target MPIO 113 driver without requiring significant application downtime as described above.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to support migration of the control of multi-path logical devices from a current MPIO driver to a target MPIO driver without requiring significant application downtime as disclosed herein.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and MPIO driver migration logic 116 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the MPIO driver migration logic 116 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, MPIO driver migration logic and additional or alternative components. Also, the particular configurations of system and device elements and associated processing operations illustratively shown in the drawings can be varied in other embodiments. For example, a wide variety of different MPIO driver configurations and associated MPIO driver migration arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with a storage system;
the host device comprising:
a set of input-output queues;
a current multi-path input-output driver configured to select input-output operations from the set of input-output queues for delivery to the storage system over the network, the current multi-path input-output driver grouping a plurality of paths from the host device to a logical volume of the storage system into a current multi-path logical device;
wherein the host device is further configured:
to install a target multi-path input-output driver;
to migrate control of the current multi-path logical device to the target multi-path input-output driver from the current multi-path input-output driver, the migration comprising:
generating a duplicate multi-path logical device for the target multi-path input-output driver, the duplicate multi-path logical device comprising the same grouping of the plurality of paths as the current multi-path logical device;
adding a new path to the current multi-path logical device, the new path being configured to route input-output operations from the current multi-path logical device to the duplicate multi-path logical device; and
removing one or more paths of the current multi-path logical device other than the added new path; and
to deliver input-output operations to the storage system via the duplicate multi-path logical device using the added new path of the current multi-path logical device.

2. The apparatus of claim 1 wherein generating the duplicate multi-path logical device for the target multi-path input-output driver comprises:
obtaining a unique identifier of the current multi-path logical device;
identifying a corresponding multi-path logical device of the target multi-path input-output driver as the duplicate multi-path logical device based at least in part on the obtained unique identifier; and copying at least one attribute of the current multi-path logical device to the multi-path logical device identified as the duplicate multi-path logical device.

3. The apparatus of claim 2 wherein the at least one attribute of the current multi-path logical device comprises at least one of a small computer system interface (SCSI) and a non-volatile memory express (NVMe) personality of the current multi-path logical device.

4. The apparatus of claim 1 wherein adding the path to the current multi-path logical device comprises:

suspending the current multi-path logical device;

modifying a path mapping of the current multi-path logical device to include the new path;

resuming the current multi-path logical device; and reloading the current multi-path logical device path mapping based at least in part on the modified path mapping.

5. The apparatus of claim 1 wherein removing one or more paths of the current multi-path logical device other than the added new path comprises:

suspending the current multi-path logical device;

modifying a path mapping of the current multi-path logical device to remove one or more paths other than the new path;

resuming the current multi-path logical device; and reloading the current multi-path logical device path mapping based at least in part on the modified path mapping.

6. The apparatus of claim 1 wherein in conjunction with a reboot after migration of control of the current multi-path logical device to the target multi-path input-output driver from the current multi-path input-output driver, the host device is further configured:

to generate a plurality of multi-path logical devices;

to determine whether or not a given one of the generated multi-path logical devices corresponds to the duplicate multi-path logical device;

in response to determining that the given one of the generated multi-path logical devices correspond to the duplicate multi-path logical device, to generate a link from the current multi-path logical device to the given one of the generated multi-path logical devices such that input-output operations directed toward the current multi-path logical device are redirected to the given one of the generated multi-path logical devices.

7. The apparatus of claim 6 wherein determining whether or not the given one of the generated multi-path logical devices corresponds to the duplicate multi-path logical device comprises comparing an identifier corresponding to the given one of the generated multi-path logical devices to an entry in a data structure that associates the duplicate multi-path logical device with the current multi-path logical device.

8. A method comprising:

installing a target multi-path input-output driver on a host device, the host device comprising a current multi-path input-output driver that is configured to select input-output operations from a set of input-output queues of the host device for delivery to a storage system over a network, the current multi-path input-output driver grouping a plurality of paths from the host device to a logical volume of the storage system into a current multi-path logical device;

migrating control of the current multi-path logical device to the target multi-path input-output driver from the current multi-path input-output driver, the migration comprising:

generating a duplicate multi-path logical device for the target multi-path input-output driver, the duplicate multi-path logical device comprising the same grouping of the plurality of paths as the current multi-path logical device;

adding a new path to the current multi-path logical device, the new path being configured to route input-output operations from the current multi-path logical device to the duplicate multi-path logical device; and removing one or more paths of the current multi-path logical device other than the added new path; and delivering input-output operations to the storage system via the duplicate multi-path logical device using the added new path of the current multi-path logical device.

9. The method of claim 8 wherein generating the duplicate multi-path logical device for the target multi-path input-output driver comprises:

obtaining a unique identifier of the current multi-path logical device;

identifying a corresponding multi-path logical device of the target multi-path input-output driver as the duplicate multi-path logical device based at least in part on the obtained unique identifier; and copying at least one attribute of the current multi-path logical device to the multi-path logical device identified as the duplicate multi-path logical device.

10. The method of claim 9 wherein the at least one attribute of the current multi-path logical device comprises at least one of a small computer system interface (SCSI) and a non-volatile memory express NVMe personality of the current multi-path logical device.

11. The method of claim 8 wherein adding the path to the current multi-path logical device comprises:

suspending the current multi-path logical device;

modifying a path mapping of the current multi-path logical device to include the new path;

resuming the current multi-path logical device; and reloading the current multi-path logical device path mapping based at least in part on the modified path mapping.

12. The method of claim 8 wherein removing one or more paths of the current multi-path logical device other than the added new path comprises:

suspending the current multi-path logical device;

modifying a path mapping of the current multi-path logical device to remove one or more paths other than the new path;

resuming the current multi-path logical device; and reloading the current multi-path logical device path mapping based at least in part on the modified path mapping.

13. The method of claim 8 wherein in conjunction with a reboot after migration of control of the current multi-path logical device to the target multi-path input-output driver from the current multi-path input-output driver, the method further comprises:

generating a plurality of multi-path logical devices;

determining whether or not a given one of the generated multi-path logical devices corresponds to the duplicate multi-path logical device;

in response to determining that the given one of the generated multi-path logical devices correspond to the duplicate multi-path logical device, generating a link from the current multi-path logical device to the given one of the generated multi-path logical devices such that input-output operations directed toward the current multi-path logical device are redirected to the given one of the generated multi-path logical devices.

14. The method of claim 13 wherein determining whether or not the given one of the generated multi-path logical devices corresponds to the duplicate multi-path logical device comprises comparing an identifier corresponding to the given one of the generated multi-path logical devices to an entry in a data structure that associates the duplicate multi-path logical device with the current multi-path logical device.

15. A computer program product comprising a non-transitory processor-readable storage medium having stored therein program code of one or more software programs, wherein the program code, when executed by a host device comprising a current multi-path input-output driver and a set of input-output queues, the host device being configured to communicate over a network with a storage system, the current multi-path input-output driver configured to select input-output operations from the set of input-output queues for delivery to the storage system over the network, the current multi-path input-output driver grouping a plurality of paths from the host device to a logical volume of the storage system into a current multi-path logical device, causes the host device:

to install a target multi-path input-output driver;
to migrate control of the current multi-path logical device to the target multi-path input-output driver from the current multi-path input-output driver, the migration comprising:
generating a duplicate multi-path logical device for the target multi-path input-output driver, the duplicate multi-path logical device comprising the same grouping of the plurality of paths as the current multi-path logical device;
adding a new path to the current multi-path logical device, the new path being configured to route input-output operations from the current multi-path logical device to the duplicate multi-path logical device; and
removing one or more paths of the current multi-path logical device other than the added new path; and
to deliver input-output operations to the storage system via the duplicate multi-path logical device using the added new path of the current multi-path logical device.

16. The computer program product of claim 15 wherein generating the duplicate multi-path logical device for the target multi-path input-output driver comprises:
obtaining a unique identifier of the current multi-path logical device;
identifying a corresponding multi-path logical device of the target multi-path input-output driver as the duplicate multi-path logical device based at least in part on the obtained unique identifier; and
copying at least one attribute of the current multi-path logical device to the multi-path logical device identified as the duplicate multi-path logical device.

17. The computer program product of claim 15 wherein adding the path to the current multi-path logical device comprises:
suspending the current multi-path logical device;
modifying a path mapping of the current multi-path logical device to include the new path;
resuming the current multi-path logical device; and
reloading the current multi-path logical device path mapping based at least in part on the modified path mapping.

18. The computer program product of claim 15 wherein removing one or more paths of the current multi-path logical device other than the added new path comprises:
suspending the current multi-path logical device;
modifying a path mapping of the current multi-path logical device to remove one or more paths other than the new path;
resuming the current multi-path logical device; and
reloading the current multi-path logical device path mapping based at least in part on the modified path mapping.

19. The computer program product of claim 15 wherein in conjunction with a reboot after migration of control of the current multi-path logical device to the target multi-path input-output driver from the current multi-path input-output driver, the host device is further configured:
to generate a plurality of multi-path logical devices;
to determine whether or not a given one of the generated multi-path logical devices corresponds to the duplicate multi-path logical device;
in response to determining that the given one of the generated multi-path logical devices correspond to the duplicate multi-path logical device, to generate a link from the current multi-path logical device to the given one of the generated multi-path logical devices such that input-output operations directed toward the current multi-path logical device are redirected to the given one of the generated multi-path logical devices.

20. The computer program product of claim 19 wherein determining whether or not the given one of the generated multi-path logical devices corresponds to the duplicate multi-path logical device comprises comparing an identifier corresponding to the given one of the generated multi-path logical devices to an entry in a data structure that associates the duplicate multi-path logical device with the current multi-path logical device.

* * * * *